United States Patent [19]

Heinrich et al.

[11] Patent Number: 5,606,323
[45] Date of Patent: Feb. 25, 1997

[54] DIODE MODULATOR FOR RADIO FREQUENCY TRANSPONDER

[75] Inventors: Harley K. Heinrich, Brewster; Daniel J. Friedman, Tarrytown, both of N.Y.

[73] Assignee: International Business Machines Corporation, Armonk, N.Y.

[21] Appl. No.: 521,898

[22] Filed: Aug. 31, 1995

[51] Int. Cl.⁶ .............................. H04B 1/59; H04Q 1/18
[52] U.S. Cl. ........................... 342/51; 340/825.54
[58] Field of Search ............... 342/44, 51; 340/572, 340/825.54, 825.72

[56] References Cited

U.S. PATENT DOCUMENTS

| 4,075,632 | 2/1978 | Baldwin et al. | 342/51 |
| 4,345,253 | 8/1982 | Hoover | 342/44 |
| 4,724,427 | 2/1988 | Carroll | 340/825.54 |
| 4,786,907 | 11/1988 | Koelle | 342/51 |
| 5,166,676 | 11/1992 | Milheiser | 340/825.54 |

*Primary Examiner*—Ian J. Lobo
*Attorney, Agent, or Firm*—Louis J. Percello

[57] ABSTRACT

A diode modulator which is not part of the rectifier power supply circuit of an RF Transponder is controlled by the transponder electronic logic and memory circuitry to conduct RF current from a second terminal to a first terminal of the RF Transponder antenna in a first state of the transponder electronic circuitry, and does not conduct appreciable current in a second state of the transponder electronic circuitry, thereby changing the loading of the RF Transponder antenna between the first state and the second state of the transponder electronic circuitry, and thereby changing the intensity of the RF radiation backscattered from the RF Tag. The present invention has further advantages that the same diode used as a modulator can also be used in the transponder receiver circuit.

13 Claims, 2 Drawing Sheets

DIODE MODULATOR FOR RADIO FREQUENCY TRANSPONDER

FIELD OF THE INVENTION

The field of the invention is the field of Radio Frequency (RF) transponders (RF Tags) which receive RF electromagnetic radiation from a base station and send information to the base station by modulating the load of an RF antenna.

DESCRIPTION OF THE PRIOR ART

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

A combination diode rectifier circuit and balanced modulator for modulating the antenna current at twice the carrier frequency was proposed by Gary T. Carroll in U.S. Pat. No. 4,724,427.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology. The use of the prior art transistor switches to change the loading of the transponder antenna, however, leads to increased cost in the use of a totally integrated system consisting of a single chip connected to an antenna. The transistor switch of the prior art must be fast enough and have low capacitance to work well at the high carrier frequencies needed to transfer all the information that can be contained on a chip in a reasonable time. Such transistors lead to increased costs in the chip manufacturing, as the entire chip must be made with the same technology and the entire chip does not need the speed of the one transistor element. The range of the communication distance from the base station to the tag is critical. This range is determined by the voltage built up by the antenna and rectifying circuits on the tag. Prior art tags, however, have modulating circuits and receiver circuits which reduce the voltage which can be produced by the rectifier circuits. Prior art tags which use a different frequency than that of the base station carrier frequency are disadvantageous in that the antenna usually has maximum efficiency if it is designed for a single frequency.

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with maximum range. It is a further object of the invention to produce an electronic chip for an RF transponder which can be produced simply with standard semiconductor manufacturing techniques. It is a further object of the invention to produce a communication system for communicating with the RF transponder of the present invention. It is a further object of the invention to produce a system for controlling the communication system using the present invention. It is a further object of the invention to produce a system for using and changing information received from the transponder of the present invention.

SUMMARY OF THE INVENTION

The invention provides a diode modulator which is not part of the rectifier power supply circuit of passive RF Transponder and which is controlled by the transponder electronic circuitry to conduct RF current from a second terminal to a first terminal of the RF Transponder antenna in a first state of the transponder electronic circuitry, and does not conduct appreciable current in a second state of the transponder electronic circuitry, thereby changing the loading of the RF Transponder antenna between the first state and the second state of the transponder electronic circuitry, and thereby changing the intensity of the RF radiation backscattered from the RF Tag. The present invention has further advantages that the same rectification means used as a modulator can also be used in the receiver circuit.

DETAILED DESCRIPTION OF THE INVENTION

Figure 1:
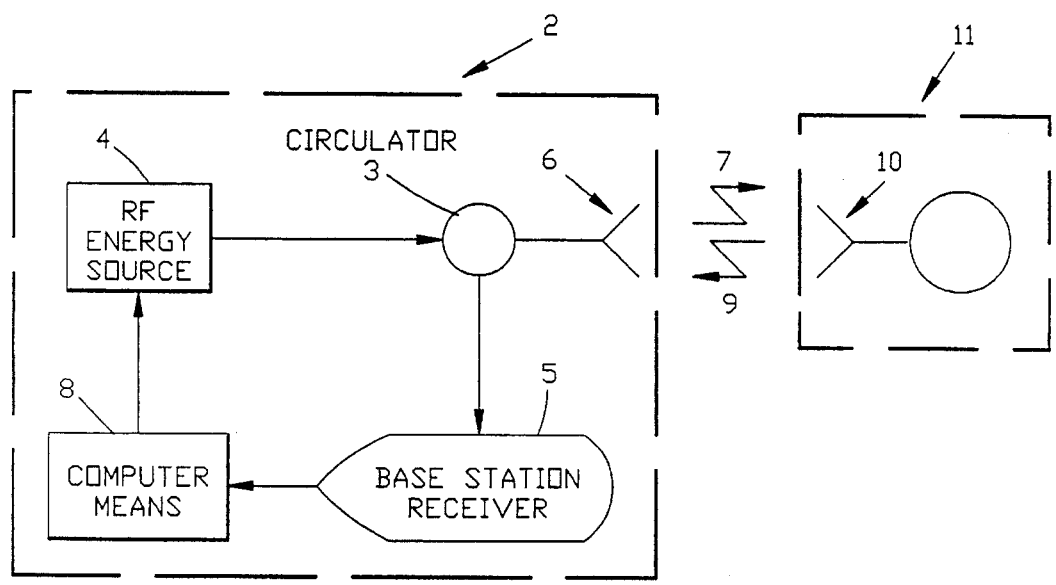
FIG. 1 is a block diagram of a system for sending and receiving RF power and information to and from an RF tag.

A block diagram of a base station and an RF transponder is shown in FIG. 1. The base station 2 comprises a source of RF energy 4 connected to at least one base station antenna 6. Computer means 8 may control the power and frequency of the RF energy source 4. An RF electromagnetic wave 7 is sent from the antenna 6 of the base station to the antenna 10 of the RF transponder. The antenna 10 of the transponder may "backscatter" the electromagnetic wave, and the back-scattered wave 9 can be picked up by the antenna 6 or another antenna (not shown) of the base station and routed by circulator 3 to a base station receiver 5 which demodulates the backscattered signal and which sends the demodulated signal to computer means 8. Computer means 8 may be used to receive, process, store, and use information received from this demodulated signal for further decisions or may send the information to display means or communication means (not shown).

A preferred frequency of the base station is RF or microwave frequency above 400 MHZ. A more preferred frequency of the base station is above 900 MHZ. The most preferred frequency of the base station is above 2,300 MHZ.

Figure 2:
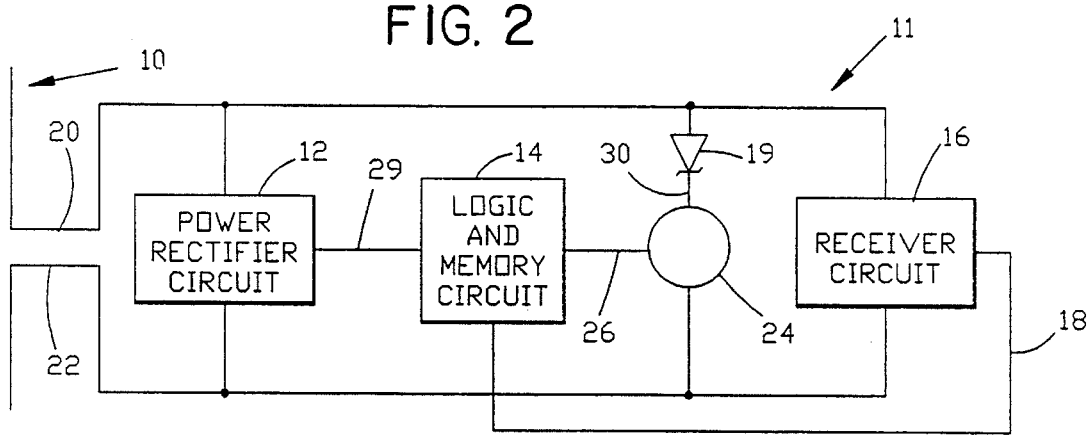
FIG. 2 is a block diagram of the transponder of the present invention.

The transponder 11 of the present invention is sketched in the block diagram of FIG. 2. A dipole antenna 10 is shown connected by leads 20 and 22 to a power rectifier circuit shown by block 12. However, any antenna design may be used with the present invention. These antenna designs are well known to persons skilled in the art of antenna design and may be antennas such as whip antennas, loop antennas, patch antennas, folded dipole antennas, bent dipole antennas, etc. The tag may carry more than one antenna. Energy for the logic and memory circuits as sketched by block 14 of the tag is tapped off the power rectifier circuit by lead 29. The rectification means of the invention is shown by diode 19 which is connected between the antenna lead in taps 20 and 22 by a switching circuit 24. The diode 19 and the switching circuit 24 are in parallel with the power rectifier circuit 12. The diode 19 is not part of the power rectifier circuit 12. The switch circuit 24 is controlled over line 26 by the logic and memory circuits shown by block 14. The backscattered radiation from the antenna 10 is effectively controlled by the state of the switch circuit 24. The diode 19 effectively "shorts out" the antenna in a first state of switch circuit 24 induced by a first state of the logic and memory circuits 14. In the first half cycle of the RF electromagnetic (EM) wave which induces current in the antenna 10, the current flows from one leg of antenna 10 though lead 20 and substantially through diode 19 to lead 30 through the switch 24 to lead 22 to the other leg of the antenna 10. In the second half cycle of the RF signal inducing current in antenna 10, the current flows substantially from the other leg of antenna 10 through lead 22 and through a diode means of the power rectification circuit 12 to lead 20 to the first leg of the antenna 10. Thus, the antenna is shorted and high current can be carried from one leg of the antenna to the other on both cycles of the RF EM wave. If the antenna is resonant with the incoming RF field, the high current circulating will lead to a high radiation of power and substantial "back scattering". In a second state of the switch circuit 24 induced by a second state of the logic and memory circuits 14 the diode 19 can not conduct substantial current, and hence in the first half cycle of the RF EM wave the current flows from one leg of the antenna 10 through lead 20 and to lead 22 to the other leg of the antenna 10 only through the power circuitry denoted by block 12, and less current is carried by the resonant antenna. Less power is therefore radiated from the antenna than when the control circuit is in the first state. If the antenna is not resonant with the incoming RF EM field, more power may not be radiated in the first state compared to the second state. However, there will in general still be a difference in the radiated power which can be picked up and decoded by the base station.

The most preferred tag has an antenna which is resonant with the base station carrier frequency, and the base station receives signals from the tag carried as a modulation of the base station carrier frequency.

A receiver circuit 16 is shown connected in parallel with the rectifier circuit 12. The receiver circuit sends data received from the base station to the logic and memory circuits 14 over lead 18. The receiver circuit may also advantageously be part of the rectification circuit (not shown) or part of the modulation circuit (shown later).

In the prior art, a transistor switch controlled by signals from logic and memory circuits has been used to modulate the antenna current. Prior art transistors, however, are expensive low capacitance elements, since a transistor with too high a capacitance would act as a partial high frequency short for the antenna 10 even in the "off" state. The most preferred diode of the present invention is a Schottky diode, which has very low capacitance, and the total capacitance of the Schottky diode 19 and switch 24 in the off state add as capacitances in series to give a low capacitance. The Schottky diode 19 also may be integrated on a single chip with the n-FET and p-FET transistors of modern electronics, as well as the elements of logic and memory circuits 14 and other RF analogue circuitry needed so that all the electronic elements for a transponder can be incorporated in one chip. While a single diode has been shown, it is clear to one skilled in the art that any RF current rectifying element or elements having sufficiently low capacitance could be used in place of diode 19.

Figure 3:
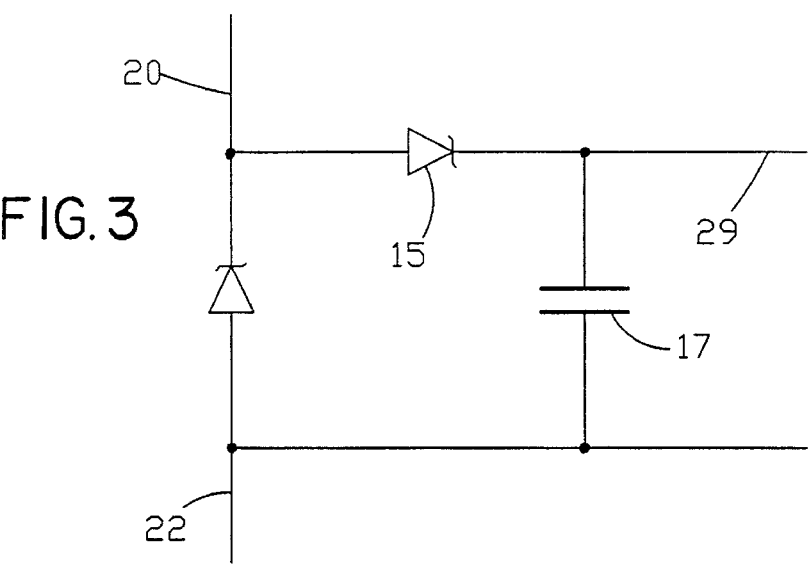
FIG. 3 is a diagram of a preferred circuit for powering the transponder of the present invention.

A preferred embodiment for a power rectifier circuit is shown in FIG. 3. Diodes 15 and 13 form a voltage doubling circuit, along with capacitor 17, for supplying power to logic and memory circuits over lead 29. While a simple voltage rectification and doubling scheme comprising diode 13, diode 15, and capacitance 17 is shown in the diagram 3, other full or partial wave rectification schemes as known in the art, and voltage doubling or other voltage multiplication and addition schemes known in the art of power supplies, could be used as well.

The logic and memory circuits of block 14, not shown, are well known in the art. The most preferred read/write memory elements would use EEPROM (electrically erasable programmable read only memory) technology, but other technologies such as ferroelectric memory elements could be used as well.

Figure 4:
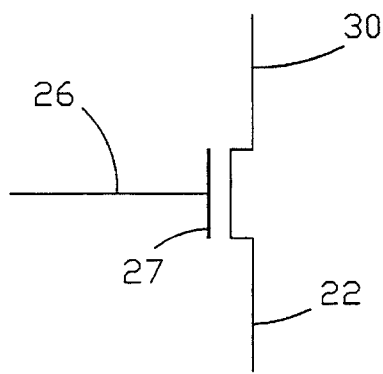
FIG. 4 shows a circuit of the most preferred switch arrangement for switching the diode of the present invention.

The preferred switch circuit 24, controlled by a voltage on lead 26 from the logic and memory circuits 14 is shown in FIG. 4 uses a single n-fet transistor 27 to drive the low side of diode 19 to the voltage on line 22 when n-fet transistor 27 is "on".

Figure 5:
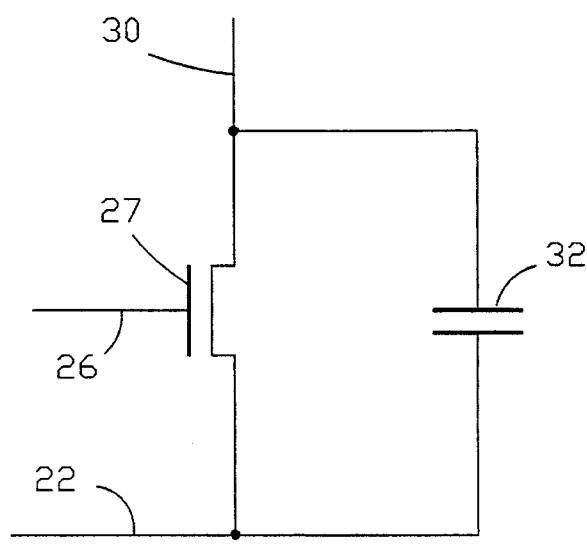
FIG. 5 is a preferred switch arrangement which allows the diode of the modulator to be used advantageously in the tag receiver circuit.

A preferred switch circuit, shown in FIG. 5, includes a capacitor 32. The voltage across the capacitor 32 can be measured, and the modulation of the RF signal sent by the base station can be determined by this measurement. In this way, neither the tag modulator nor the tag receiver is part of the diode power supply, and hence the power supply can deliver a larger voltage to the tag electronics. The RC time constant of the capacitor 32 and the voltage measuring circuit must to be small enough to follow the modulation frequency imposed on the carrier frequency by the base station. The capacitance of the n-fet transistor 27 in the off state may be suitable for this purpose by itself.

Figure 6:
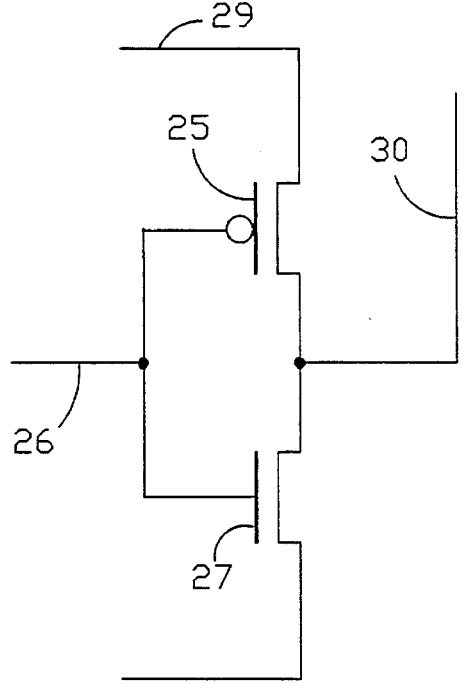
FIG. 6 is a further preferred switch arrangement for switching the diode of the present invention.

A preferred switch circuit, shown in FIG. 6, uses an additional p-fet transistor 25 to pull down and shut off the diode 19 when the voltage on lead 26 changes from a 1 to a 0 voltage. The low side of the diode 19 is connected to the power supply voltage lead 29 and is biased off. This arrangement allows the diode 19 to shut off much faster than the circuit of FIG. 4. However, the invention is not limited to the particular type of switching circuit used to bias diode 19 on and off under control of the control circuit The push pull circuit sketched in FIG. 6 is but one of a number of schemes well known to one skilled in the art which could be used to bias the low voltage side of diode 19 and to switch the RF current to lead 22 on and off, under control of the memory and logic circuits 14. The switches of the circuits of FIGS. 4, 5 and 6 need only be as fast as the modulation frequency required to modulate the back scattered radiation from the antenna 10. This modulation frequency is preferably between 1 kHz and 1 MHZ, more preferably between 10 and 100 kHz, and most preferably between 20 and 60 kHz.

We claim:

1. A radio frequency (RF) transponder comprising;

an antenna for receiving power and information transported from a base station to the RF transponder by means of an RF electromagnetic (EM) wave;

a first means for receiving RF power from the antenna and for distributing energy to components of the transponder, said first means comprising an RF current rectification means;

a second means for controlling power radiated from the antenna, said second means for controlling power radiated from the antenna receiving energy only from said first means;

a third means for receiving information from the antenna, said third means for receiving information communicating information to the second means for controlling power; and a fourth means for RF current rectification, said fourth means for RF current rectification being apart from said first means, said fourth means for RF current rectification controlled by said second means for controlling power to conduct substantial RF current from the antenna in a first state of said second means for controlling power, and to not conduct substantial RF current from the antenna in a second state of said second means for controlling power; thereby modulating the amplitude of the RF current in the antenna and modulating the RF EM radiation backscattered from the antenna.

2. The RF transponder of claim 1 wherein the second means for controlling power radiated from the antenna comprises logic and memory circuitry.

3. The RF transponder of claim 2, wherein the fourth means for RF current rectification is controlled by a fifth switch means controlled by the second means for controlling power.

4. The RF transponder of claim 3, wherein the fifth switch means is a transistor switch connected between the low side of the fourth means for RF current rectification a first terminal of the antenna, and the high side of the fourth means for RF current rectification is connected to a second terminal of the antenna.

5. The RF transponder of claim 4, wherein the third means for receiving information is connected in parallel with the transistor switch between the low side of the fourth means for RF current rectification and the first terminal of the antenna.

6. The RF transponder of claim 5, wherein a sixth capacitance means is connected in parallel with the transistor switch between the low side of the fourth means for RF current rectification and the first terminal of the antenna.

7. The RF transponder of claim 3, wherein the fifth switch means is a push pull circuit connecting the low side of fourth means for RF current rectification to the first terminal in the first state of the second means for controlling power, thereby allowing substantial RF current to flow through said fourth means for RF current rectification, and for connecting the low side of the fifth means for RF current rectification to a positive voltage output of the first means for receiving power in the second state of the second means for controlling power, thereby positively preventing substantial RF current flow in the fourth means for RF current rectification.

8. The RF transponder of claim 4, wherein the fourth means for RF current rectification is a Schottky diode.

9. The RF transponder of claim 5, wherein the fourth means for RF current rectification is a Schottky diode.

10. The RF transponder of claim 6, wherein the fourth means for RF current rectification is a Schottky diode.

11. The RF transponder of claim 7, wherein the fourth means for RF current rectification is a Schottky diode.

12. A system for locating and identifying objects, comprising;

a base station for transmitting and receiving information, the base station comprising an RF transmitter, an RF receiver, and at least one base station antenna, and;

a plurality of RF transponders associated with the objects, the RF Transponders able to transmit to and receive information from the base station, each transponder comprising at least one transponder antenna for receiving power and information transported from a base station to the RF transponder by means of an RF electromagnetic (EM) wave, said at least one transponder antenna having a first terminal and a second terminal, a first means for receiving power from the transponder antenna and for distributing energy to components of the transponder, said first means connected to the first terminal and the second terminal of the transponder antenna, said first means comprising an RF current rectification circuit, a second means for controlling power radiated from the transponder antenna, said second means receiving energy only from said first means, a third means for receiving information from the transponder antenna, said third means for receiving information receiving energy only from said first means, said third means for receiving information transmitting information to said second means, a fourth means for RF current rectification, which is not part of said first means, said fourth means for RF current rectification controlled by said second means to conduct substantial RF current between two terminals of at least one antenna in a first state of said second means, and to not conduct substantial current between the two terminals of the at least one antenna in a second state of said second means for controlling power.

13. The system for locating and identifying objects of claim 12, wherein the base station further comprises computer means for receiving information from the plurality of transponders.

* * * * *